(No Model.) 9 Sheets—Sheet 1.

J. P. CLEAL.
CASH REGISTER.

No. 583,889. Patented June 8, 1397.

Fig. 1.

Witnesses
Martin H. Olsen.
Leonora Wiseman.

Inventor
Joseph P. Cleal
by Edward Rector
his atty.

(No Model.)　　　　　　J. P. CLEAL.　　　9 Sheets—Sheet 2.
CASH REGISTER.

No. 583,889.　　　　　　　　Patented June 8, 1897.

Witnesses
Martin H. Olsen.
Leonora Wiseman.

Inventor
Joseph P. Cleal
by Edward Rector
his atty (No Model.)  9 Sheets—Sheet 3.

J. P. CLEAL.
CASH REGISTER.

No. 583,889.  Patented June 8, 1897.

Fig. 3.

Witnesses
Martin H. Olsen.
Leonora Wiseman.

Inventor.
Joseph P. Cleal
by Edward Rector
his atty (No Model.) 9 Sheets—Sheet 5.
J. P. CLEAL.
CASH REGISTER.

No. 583,889. Patented June 8, 1897.

Fig. 5.

Witnesses
Martin H. Olsen.
Leonora Wiseman.

Inventor
Joseph P. Cleal
by Edward Rector
his atty (No Model.) 9 Sheets—Sheet 6.

J. P. CLEAL.
CASH REGISTER.

No. 583,889. Patented June 8, 1897.

Witnesses
Martin H. O'Brien
Leonora Wiseman

Inventor
Joseph P. Cleal
by Edward Rector
his atty.

(No Model.)  
9 Sheets—Sheet 8.

J. P. CLEAL.
CASH REGISTER.

No. 583,889.  
Patented June 8, 1897.

Witnesses  
Martin H. Olsen  
Leonora Niemann

Inventor  
Joseph P. Cleal  
by Edward Rector  
his atty (No Model.) 9 Sheets—Sheet 9.

J. P. CLEAL.
CASH REGISTER.

No. 583,889. Patented June 8, 1897.

Witnesses
Martin H. Olsen.
Leonora Niemann.

Inventor
Joseph P. Cleal
by Edward Rector
his atty

UNITED STATES PATENT OFFICE.

JOSEPH P. CLEAL, OF DAYTON, OHIO, ASSIGNOR TO THE NATIONAL CASH REGISTER COMPANY, OF SAME PLACE.

CASH-REGISTER.

SPECIFICATION forming part of Letters Patent No. 583,889, dated June 8, 1897.

Application filed June 25, 1896. Serial No. 596,857. (No model.)

*To all whom it may concern:*

Be it known that I, JOSEPH P. CLEAL, a citizen of the United States, residing at Dayton, in the county of Montgomery, in the State of Ohio, have invented a certain new and useful Improvement in Cash-Registers, of which the following is a description, reference being had to the accompanying drawings, forming part of this specification.

My invention will be illustrated and described as an improvement upon a certain well-known style of cash-register now in extensive use, one of the latest forms of which is shown and described in the pending application of Cleal and Reinhard, Serial No. 542,414, filed March 19, 1895; but some of its features are applicable to other styles of machines, as will be understood from the description given of the invention.

The principal feature of the invention relates to the employment in the machine of a series of special registers or counters appropriated to different special purposes and their novel combination with the main totalizing cash-register of the machine and with the operating devices of the machine, all as will be hereinafter more fully explained, and particularly pointed out in the claims.

In the accompanying drawings, Fig. 4, a vertical section, at approximately the middle of the machine, looking toward the right; Fig. 4$^a$, a sectional detail of one of the special registers; Fig. 6, a vertical section of the machine between the first and second banks of keys at the right side of the machine and looking toward the right; Fig. 6$^a$, a detail view of one of the sets of special keys and their coöperating devices; Fig. 9$^a$, a detail side elevation of the detent-plate at the left-hand end of the view in Fig. 9.

The same letters of reference are used to indicate identical parts in all the figures.

Figure 1:
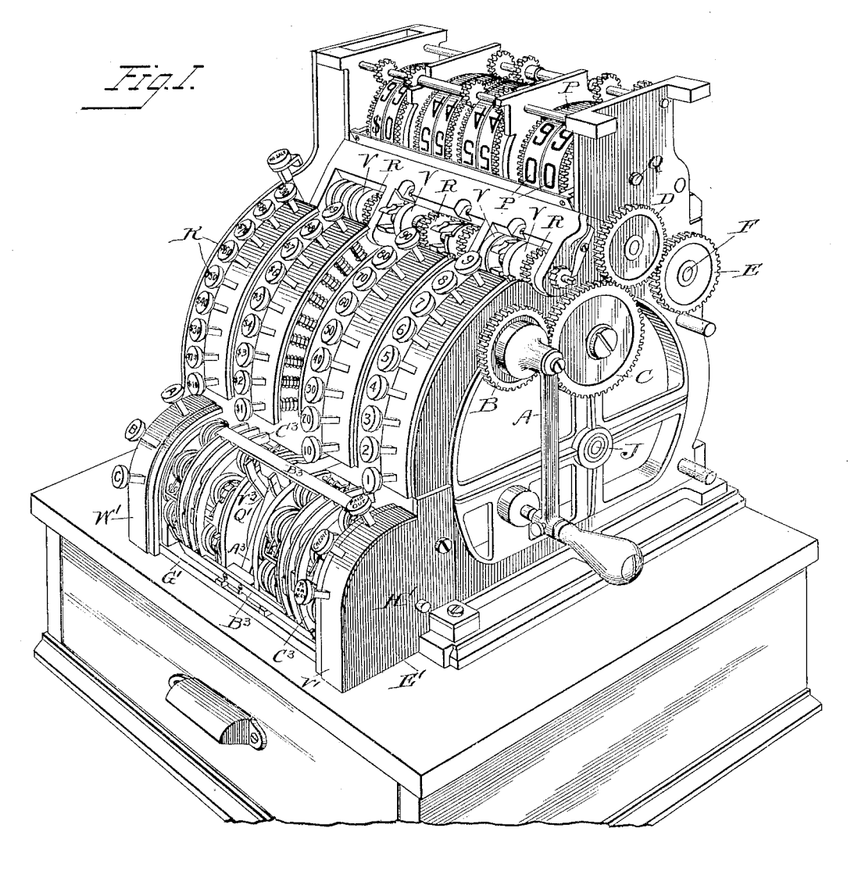
Figure 1 is a perspective view of the machine with its case removed, looking at the forward right-hand corner thereof.
Figure 3:
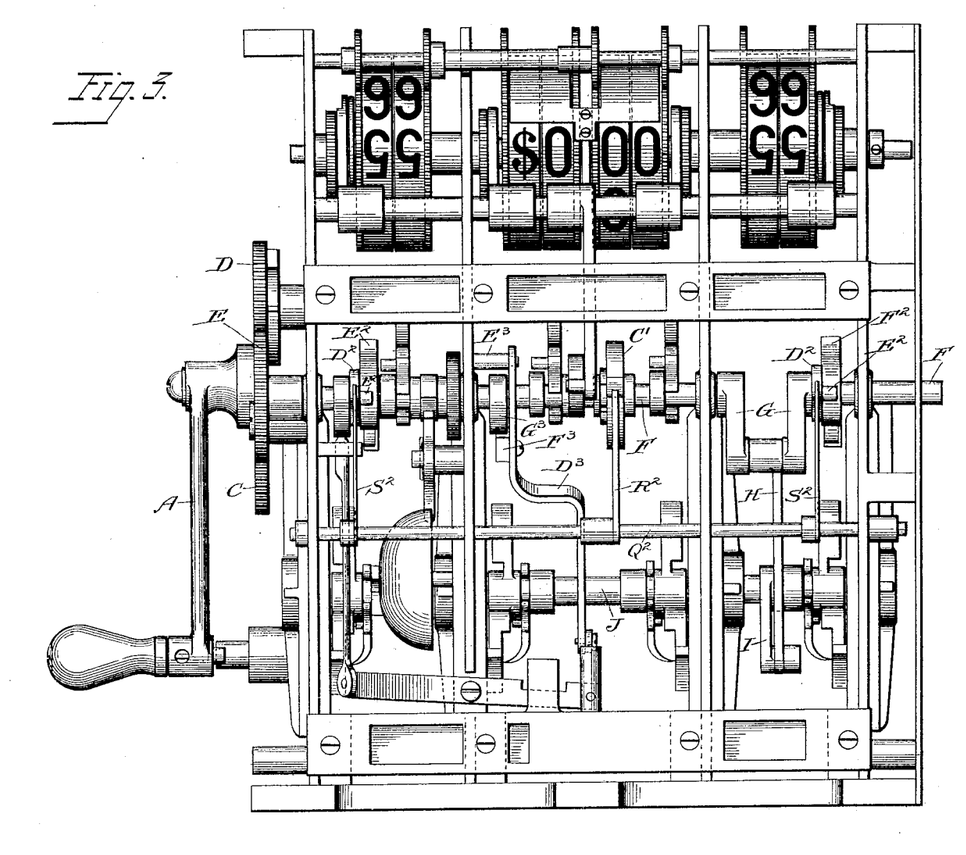
Fig. 3, an enlarged rear elevation of the machine with the base or drawer compartment upon which it rests omitted from the view.
Figure 5:
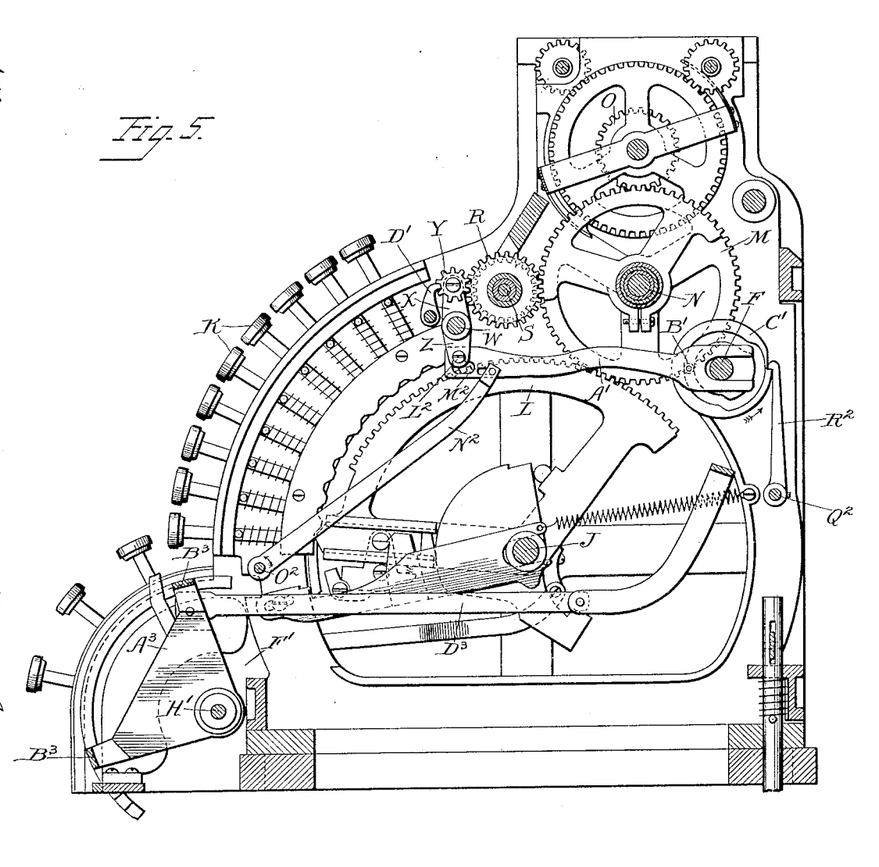
Fig. 5, a vertical section, also approximately at the middle of the machine, looking toward the left.
Figures 6, 6A:
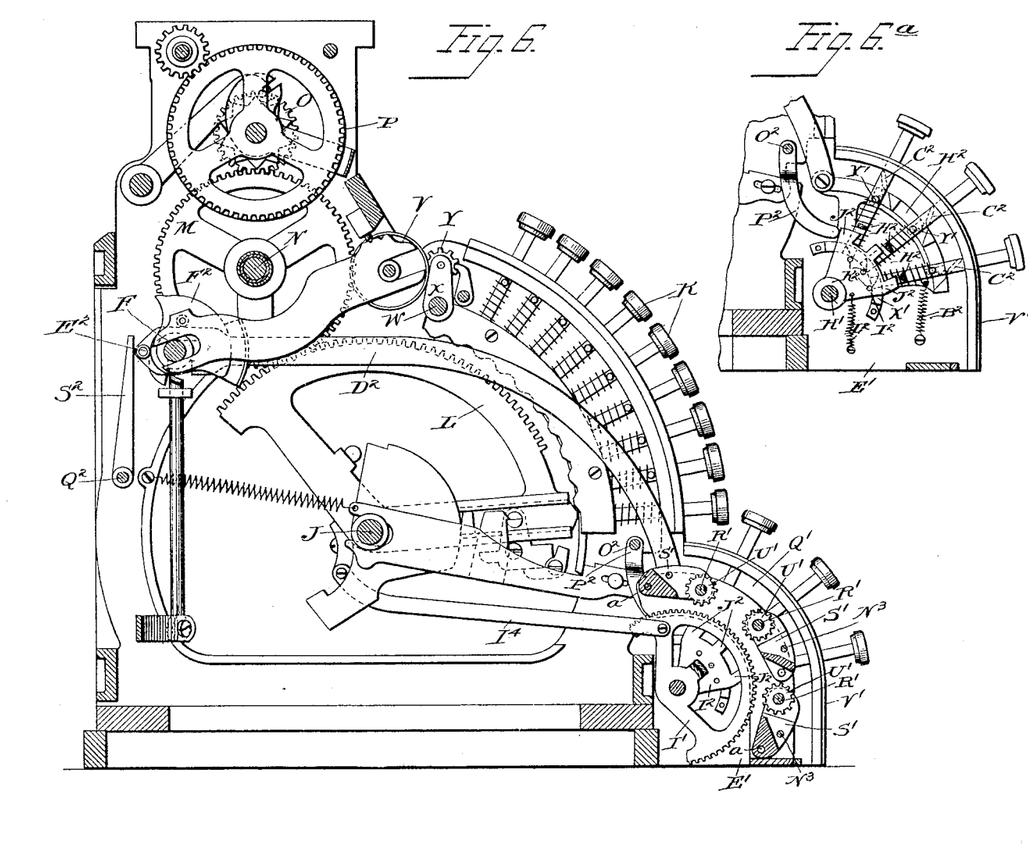
Figure 7:
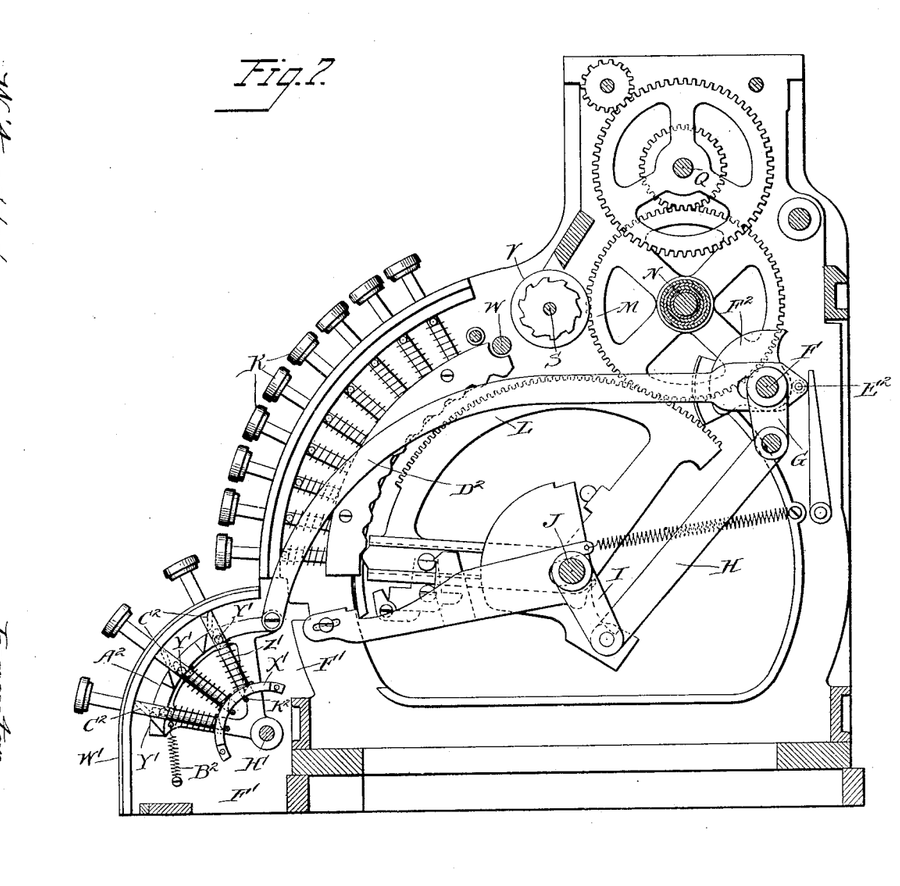
Fig. 7, a vertical section between the third and fourth banks of keys at the left side of the machine and looking toward the left.

As in the prior machines of this style, the driving-mechanism is operated by a rotary handle A, Figs. 1 and 3, which is fast upon the end of a stub-shaft which has secured upon it a gear B, meshing with a second gear C, which latter in turn meshes with a third gear D, which meshes with a fourth gear E, fast upon the right-hand end of a rotary shaft F, Figs. 3 to 7, which extends entirely across the machine near its rear side and has interposed in it near its left-hand end a crank G, Fig. 3, to which is connected the upper rear end of a pitman H, whose lower forward end is connected to an arm I, Fig. 7, fast upon a rock-shaft J, extending from side to side of the machine in the lower middle portion thereof and suitably journaled in the framework. Under this arrangement of the parts each revolution of the operating-handle A rocks the shaft J forward and backward a definite distance.

Figure 2:
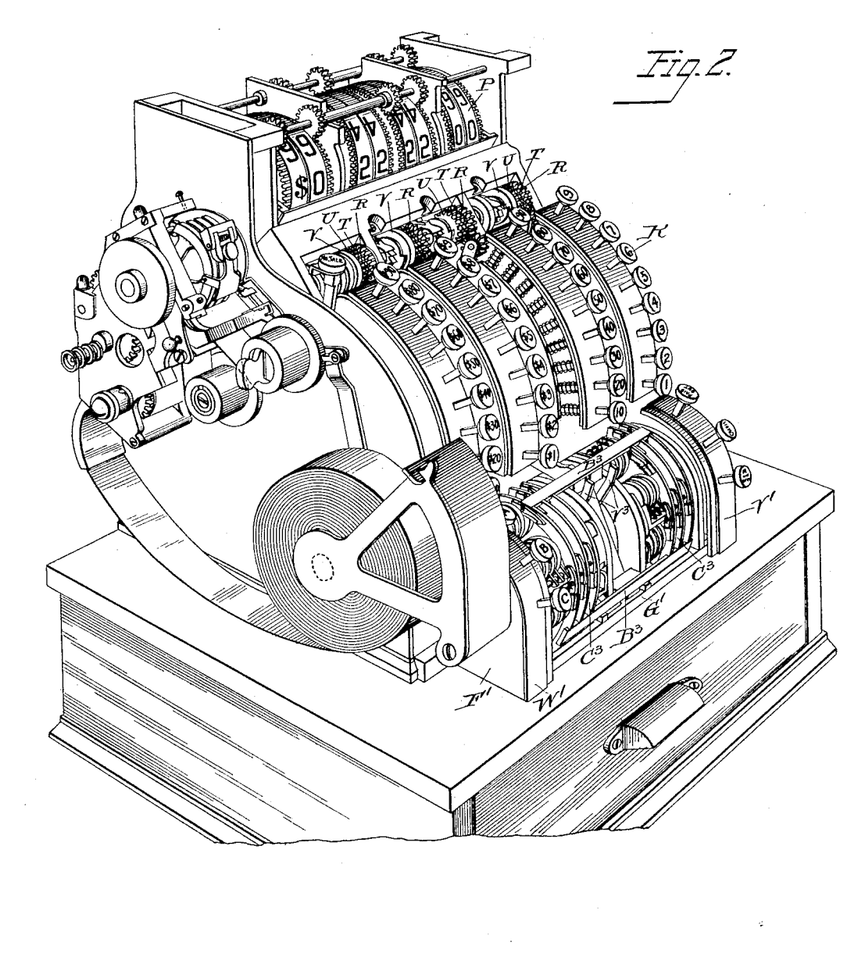
Fig. 2 is a similar view looking at the forward left-hand corner thereof.

In the present instance the machine is shown provided with four rows or banks of keys K, Figs. 1 and 2, representing, respectively, units of cents, tens of cents, units of dollars, and tens of dollars, and there are loosely mounted upon the rock-shaft J four gear-toothed segments L, Figs. 5, 6, and 7, one for each row of keys and arranged approximately in line therewith. Interposed between the respective segments L and the rock-shaft J are suitable latches or connecting devices which coöperate with the inner ends of the keys K in such manner that when a key in any given row is pressed in and the operating-handle of the machine given a revolution the rock-shaft J at the end of its forward movement will become connected to the segment corresponding to such row of keys and will carry the segment with it as it moves backward until the segment becomes disconnected from it by the inner end of the operated key, so that in its backward movement the shaft carries the segment with it a distance proportionate to the position and the value of such key. At the next operation of the machine the rock-shaft at its forward movement will pick up the segment at the point where it left it in its previous backward movement and will carry it on forward again to the end of its forward movement, and if no key in the row corresponding to this segment has been pressed in at such second operation of the machine the segment will remain in such forward position and the rock-shaft will return to normal position alone. The particular means illustrated in the drawings for accomplishing the results just described are illustrated and explained in detail in the application before referred to, while other forms of similar devices for the same purposes are shown and described in various prior patents. It will therefore be unnecessary to further refer to them here.

Figures 4, 4A:
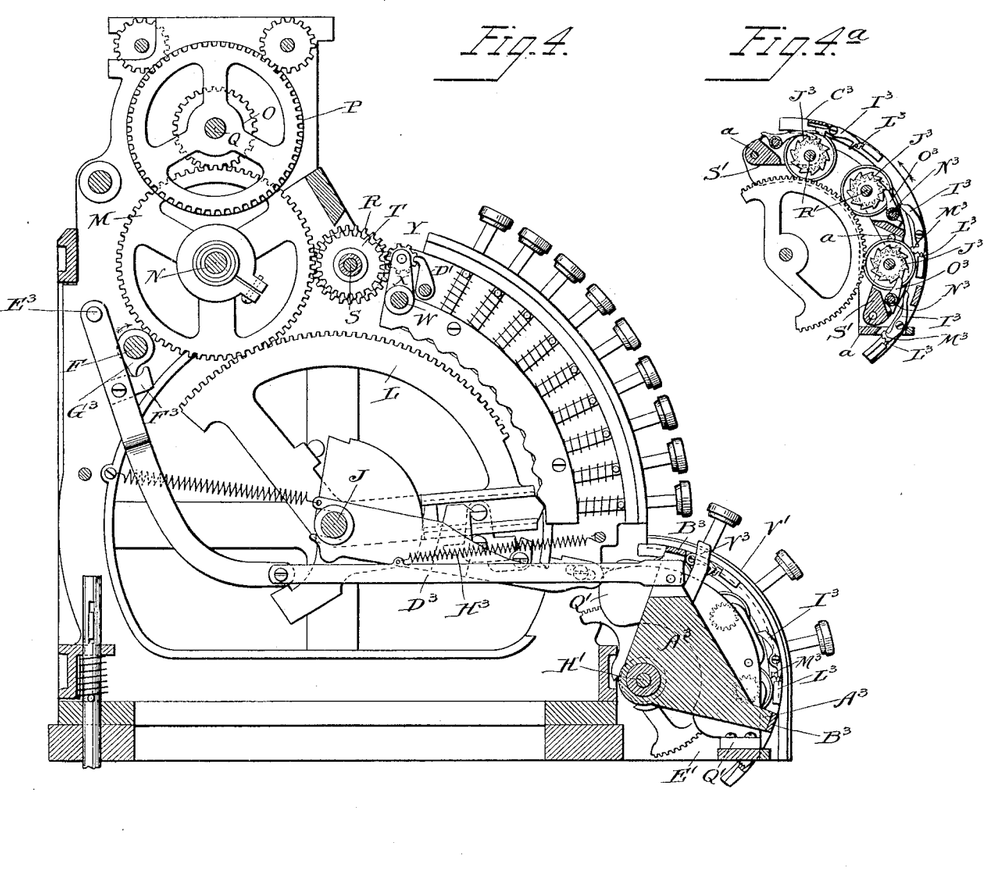

Each of the segments L meshes with a large gear-wheel M, mounted upon a shaft N above and in rear of the segments, Figs. 4, 5, and 6, and each gear M meshes with a pinion O, fast upon the sleeve or hub of an indicator-wheel P, loose upon a shaft Q. The movements of the segments L will be thus transmitted to the indicator-wheels P, so that when any segment is carried backward by the rock-shaft until it is disconnected therefrom by some one of the keys its indicator will be moved until the number representing the value of such key is brought to the indicating-point, while when the segment is moved to its extreme forward position the indicator will be moved to position to expose its cipher at the indicating-point. In the machine illustrated in the drawings there are employed eight indicator-wheels—four arranged to effect the indication at the front of the machine and four to effect it at the rear. The respective wheels are geared together in the manner described in the aforesaid application to accomplish this result.

Each of the gears M (or a segment fast upon its hub, as in Fig. 5) meshes with a pinion R, Fig. 4, loose upon a shaft B, journaled in the framework in front of the gears M and extending from side to side of the machine. Each of the pinions R has fast upon its side a smaller pinion T, Figs. 2 and 4, while loose upon the shaft S, beside such pinion T, is a pinion U of the same size fast upon the side or hub of one of the registering-wheels V. Fast upon a rock-shaft W, journaled in the framework in front of and below the pinions above described, are a series of upwardly-extending arms X, Figs. 4, 5, and 6, each of which carries an idle-pinion Y, standing in line with a pair of pinions T U. When the idle-pinions Y are thrown rearward by rocking the shaft W into mesh with the pinions T U, each pinion T will become geared to the adjacent pinion U and its registering-wheel, so that any movement imparted to the pinion T from its driving-segment L will be transmitted to the pinion U and registering-wheel. By means hereinafter described the shaft W is rocked backward and forward at each operation of the machine in such manner as to cause the idle-pinions Y to mesh with the pinions T U during the backward movement of the rock-shaft J, so that any movement imparted by said shaft to any of the segments during its backward movement will be transmitted to the corresponding registering-wheel, so that the amount indicated by the indicator-wheel at such operation will be added upon the registering mechanism. The rock-shaft W has fast upon it a short depending arm Z, Fig. 5, to which is connected the front end of a rearwardly-extending arm A', whose rear end is slotted and embraces the shaft F and which is provided in front of said shaft with a laterally-projecting stud B', which fits in a cam-groove in a disk C', fast upon the shaft F, with the result that at each operation of the machine and revolution of the shaft F the idle-pinions Y will be rocked backward and forward at the proper times for the purpose above mentioned. When in their forward position, the pinions Y are locked from movement by the engagement with them of fixed locking-dogs D', fast upon a rod secured in the framework. It will be understood that the idle-pinions Y stand out of line with the pinions R and do not mesh with the latter, as might seem to be indicated in Figs. 4 and 5.

So much of the machine as has been above described is substantially the same as that illustrated in the aforesaid application, and the explanation which has here been given of it will be sufficient for an understanding of my present invention.

Figure 8:
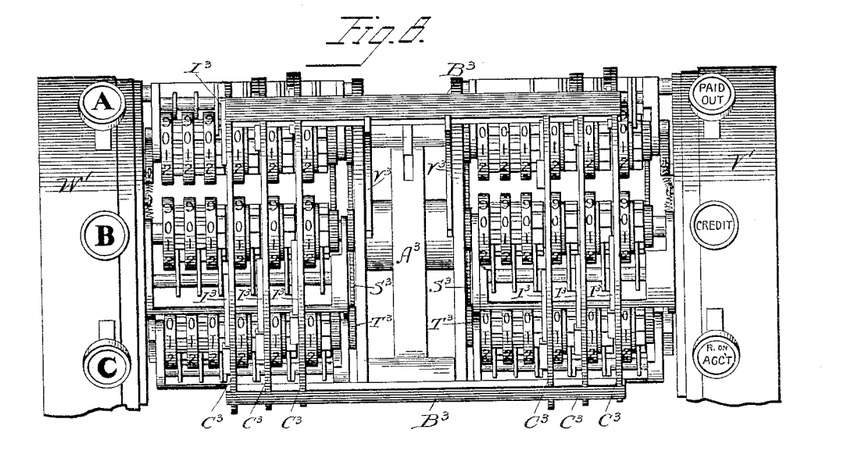
Fig. 8, an enlarged detail, in front elevation, of the two sets of special registers and their coöperating keys.

In the present instance the special registers or counters to which the principal feature of my invention relates are six in number, arranged in two sets of three each, and there are employed in connection with them six special keys, three upon either side of the machine, as shown in Figs. 1, 2, and 8. These six special registers and their respective keys may be employed for any six different purposes desired—as, for instance, for preserving separate records of the sales of six different classes of goods, or sales from six different departments of a store, or of sales by six different clerks, and so on. In the present instance, however, the three registers in the left-hand set and their three coöperating keys are employed to separately register sales made by three different clerks, designated "A," "B," and "C" by those letters upon the key-buttons, while the three registers in the right-hand set are employed to register three separate classes of transactions, one being money paid out on account, another being money received on account, and the third being goods sold on credit, and the key-buttons bear, respectively, the words "Paid out," "R. on Acc't," and "Credit." The general operation of the machine with these several special registers consists in pressing in the proper cash-keys K, representing the amount of the transaction, then pressing in one of the keys A B C to cause the amount of the sale to be registered in the counter belonging to the clerk making the sale, or, if the transaction is not a cash one or is not a sale, one of the three special keys at the right will be pressed in instead of one of the clerk's keys, and then the main operating handle of the machine will be given a complete revolution. Under this arrangement of the special registers it is desirable that the cash sales made by all three of the clerks "A," "B," and "C" shall be added into the common total on the main register of the machine heretofore described, while it is desirable that the amounts added upon the three special registers at the right side of the machine shall not be added upon such main register. To this end it is necessary that when any one of the clerk's keys A B C is pressed in the corresponding special register shall be thrown into connection with the driving mechanism and both such special register and the main register of the machine be actuated by such driving mechanism, while, on the other hand, when either one of the special keys at the right of the machine is pressed in it is necessary that the corresponding special register shall be thrown into connection with the driving mechanism, while the main register of the machine is thrown or maintained out of connection with such mechanism, so that when the operating-handle is turned such special register will be actuated by the driving mechanism, while the main register of the machine will not be actuated. I have provided novel means for accomplishing these results and bringing about this mode of operation, which will be explained in connection with the following detailed description of the special registers and the means for actuating them.

Figure 9:
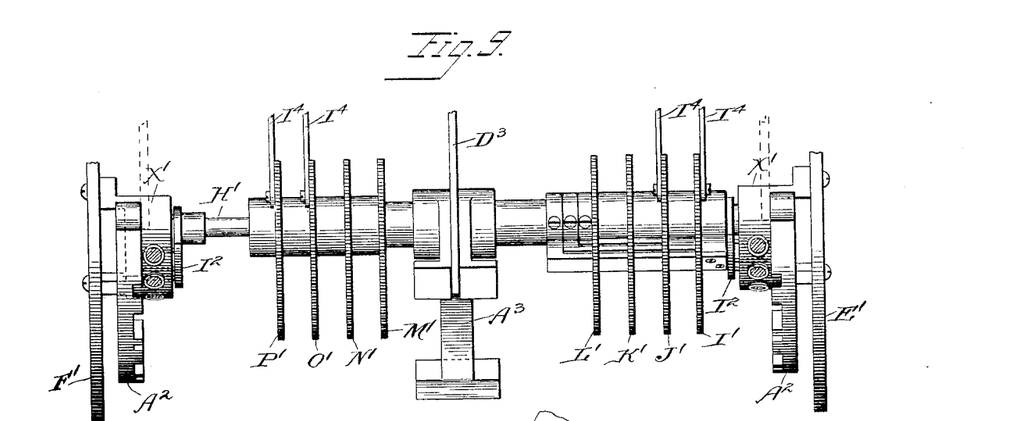
Fig. 9, a top plan view, on the same scale, of the two sets of supplemental segments which actuate the special registers and the detent-plates and some other parts coöperating with the special keys.
Figure 9A:
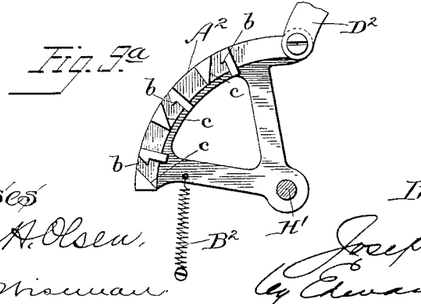

Secured to the lower forward part of the main framework of the machine is a supplemental frame consisting of two side plates E' F', of the shape shown in Figs. 1 and 2, and a cross-bar G', connecting their lower forward corners. Journaled at its opposite ends in the plates E' F' near their rear edges is a shaft H', upon which are loosely mounted eight segments, four at each side of the middle of the machine, Fig. 9. Of these eight segments the extreme right-hand one I', Figs. 6 and 9, is connected by a link $I^4$ to a pendent extension of the right-hand one of the four segments L, so that the movements of such segment L will be imparted to the segment I'. The second segment J' is similarly connected to the second one of the four segments L, so that the movements of such second segment L are imparted to the segment J'. The two segments O' and P' at the extreme left of the series of eight are respectively connected in a similar manner with the third and fourth segments L, so that the movements of such third and fourth segments L are imparted to the segments O' and P'. By suitable intermediate sleeves and connecting-arms, not necessary to be described in detail, Fig. 9, the segment I' is rigidly connected with the segment M', so that the movements imparted to the segment I' by the segment L, with which it is connected, are transmitted to the segment M', the segments I' and M' being rigidly connected together and moving in unison. The segments J' and N' are likewise connected, so that the movements imparted to the segment J' by its connected segment L will be transmitted to the segment N'. The segments K' L' are likewise respectively connected with the segments O' P', which latter, as before explained, are connected by links to the third and fourth segments L respectively, so that the movements imparted to such segments O' P' by their connected segments L will be transmitted to the segments L' K'. Under this arrangement and connection of the parts I have mounted in the supplemental frame, upon the shaft H', two separate supplemental sets of segments, each containing four segments connected, respectively, to the four main segments L of the machine, with the result that when any one of said main segments L is moved the corresponding segment in each of these supplemental sets will be likewise moved.

Figure 10:
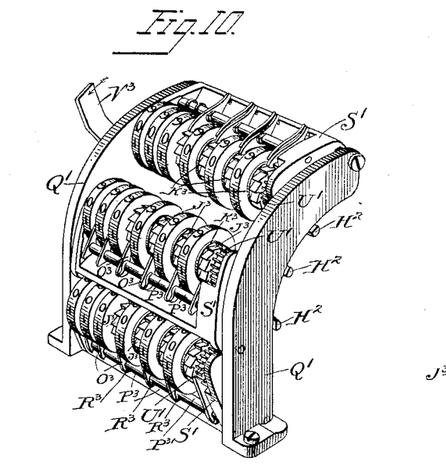
Fig. 10, a perspective view of one set of the special registers and the supplemental frame in which it is mounted.
Figure 11:
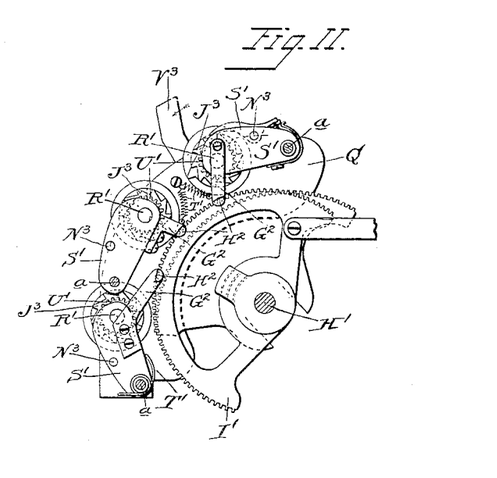
Fig. 11, a vertical section of the same just inside the right-hand side plate of the frame, being substantially an elevation of the right side of the parts shown in Fig. 10 with the side plate of the frame removed and showing also one of the actuating-segments for the registers and the resetting-segment.
Figure 12:
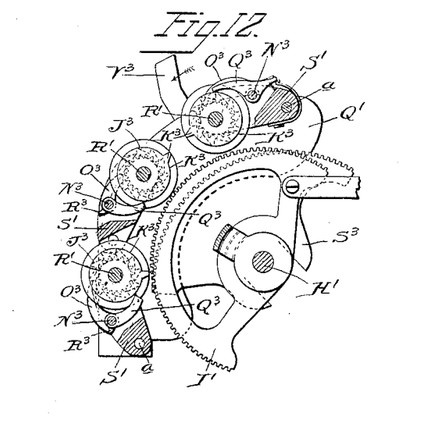
Fig. 12, a vertical section of the parts shown in Figs. 10 and 11 on a line nearer the middle of the registers than the view in Fig. 11.

Mounted in a curved frame Q', Fig. 10, over each of these sets of supplemental segments are three trains of registering-wheels, constituting the special counters or registers before referred to. As seen in Figs. $4^a$, 6, 11, and 12, each train of wheels is mounted upon a shaft R', supported at its opposite ends in the side arms of a frame S', pivoted at $a$ between the side plates of the frame Q'. Secured to the sides or hubs of the first four wheels in each train are pinions U', adapted to coöperate with the supplemental segments. By means of suitable springs T', Fig. 11, the frames S' are normally held in such position that the pinions U' are out of mesh with their respective segments, as seen in Figs. 6, 11, and 12, but these springs permit the ends of the frames S', carrying the trains of wheels, to be pressed inward toward the segments and the pinions U' brought into mesh with the segments, so that the latter may drive the registering-wheels. It will be understood that if any particular train of wheels in either set be thus thrown into gear with the segments of such set the wheels of that particular train will be actuated by any of the segments that may be moved at the ensuing operation of the machine, while the remaining trains of wheels, whose pinions are out of mesh with the segments, will not be moved. The several special registers are therefore placed at will in connection with the driving mechanism by rocking the pivoted frames S', in which they are carried, into position for their pinions U' to mesh with the supplemental segments, and this is accomplished by means of the several special keys corresponding to the special registers in the manner and by the means to be now described.

Secured to the curved outer edge of the right-hand plate E' of the supplemental frame is a plate V', Figs. 1, 4, 6, 6ª, and 8, in which are mounted radially to the shaft H' the three special keys which coöperate with the three registers in the right-hand set, while secured to the opposite side plate F' of the supplemental frame is a similar curved plate W', Figs. 2, 7, and 8, in which the three special keys coöperating with the left-hand set of special registers are mounted. The inner ends of the special keys in each set are guided in a fixed curved plate X', Figs. 6, 6ª, 7, and 9, concentric to the shaft H' and secured to the adjacent side plate E' or F' of the supplemental frame, while interposed between such plate X' and pins Y', passed through the stems of the keys, are coiled springs Z', surrounding the key-stems and serving to press the keys outward and yieldingly hold them in normal position. Loosely mounted upon the shaft H' between each plate X' and the adjacent side plate of the framework is a detent-plate $A^2$, Figs. 6ª, 7, 9, and 9ª, curved concentrically to the shaft H' and pulled downward and yieldingly held in its lower normal position by a coiled spring $B^2$. Each of these detent-plates is provided with three passage-ways for lugs $C^2$ upon the sides of the key-stems, such passage-ways being of the shape shown in Fig. 9ª, the upper rear wall or side of each passage-way being beveled or inclined downward and forward for a short distance, such beveled or inclined portion terminating in an abrupt shoulder $b$, whence the wall of the passage-way continues in a line radial to the shaft H', while the lower forward wall of each passage-way consists of a plain, beveled, or cam surface from the upper to the lower end of the passage-way. When any key is pressed inward a slight distance, its lug $C^2$, Figs. 6ª and 7, bearing against the inner surface of the upper side of the passage-way, will press the detent-plate $A^2$ upward and rearward against the stress of the spring $B^2$ until the lug $C^2$ clears the shoulder $b$, whereupon the detent-plate will be pulled forward and downward by the spring, and the shoulder will catch over the lug $C^2$ and hold the key in such slightly-depressed position with its lug beneath the beveled surface $c$ of the lower forward wall of the passage-way and in the path thereof when the detent-plate $A^2$ is pulled rearward. The rear end of the detent-plate $A^2$ has pivoted to it the forward end of a long curved arm $D^2$, Fig. 7, whose rear end is slotted and embraces the shaft F, heretofore described. The extreme rear end of the arm $D^2$ in rear of the shaft F is provided with a laterally-projecting stud $E^2$, which stands in the path of a cam $F^2$, fast upon the shaft F, with the result that at each operation of the machine and revolution of the shaft F the arm $D^2$ will be forced rearward by the cam $F^2$ and the detent-plate $A^2$ be drawn in that direction. If prior to such rearward movement of the detent-plate $A^2$ any one of the special keys has been depressed until its lug $C^2$ has been caught by the shoulder $b$ in the passage-way in the detent-plate, the beveled forward wall $c$ of the passage-way will ride over the lug $C^2$ of such key as the detent-plate is drawn rearward and will force the key inward to its limit of movement. When the cam $F^2$ clears the stud $E^2$ on the arm $D^2$ and releases the latter toward the end of the operation of the machine, the spring $B^2$ will immediately draw the detent-plate $A^2$ forward and downward, thereby releasing the key which had been pressed in and permitting its spring Z' to throw it out to normal position again.

Now each of the pivoted frames S' carrying the special registers has secured to its end adjacent the row of special keys coöperating with such set of registers an arm $G^2$, Fig. 11, which has a projection $H^2$, which stands in the path of the projecting pin Y' of one of the special keys coöperating with such set of registers, so that when any one of such keys is pressed into its limit of movement in the manner above described its pin Y' will press inward the train of registering-wheels corresponding to such key and carry their pinions U' into mesh with the supplemental segments, and the adjustment of the parts is such that this engagement of the pinions with the segments will be effected by the action of the cam $F^2$ at the end of the forward movement of the segments or the very beginning of their backward movement, while the detent-plate will be released and restored to normal position by the spring $B^2$ and the depressed key be likewise thrown out of normal position by its spring Z' at the end of the backward movement of the segment, so that the special register will be in gear with the supplemental segments during only their backward registering movements, and in this manner the registering movements of the main segments will be transmitted to the special register, while their return or resetting movements are independent of such registers.

For the purpose of normally locking the special registers out of engagement with the supplemental segments and preventing each of them from being thrown into engagement with such segments, except when the special key corresponding to the register to be engaged with the segments is first operated or set, there is loosely mounted upon the shaft H' at each side of the machine immediately adjacent the inner side of the fixed guide-plate X', in which the extreme inner ends of the keys normally fit and through which they are projected when the keys are pressed inward, a segmental locking-plate $I^2$, Figs. 6, $6^a$, and 9, which has three locking projections $J^2$, one of which in the normal operation of the parts, Fig. $6^a$, stands immediately in the path of the projection $H^2$ of the arm $G^2$ of each of the pivoted frames S', in which the special registers are mounted, as before explained. So long as this locking-plate $I^2$ remains in normal position, therefore, it is not possible to press any one of the special registers inward and engage its pinions U' with the supplemental segments. When, however, any one of the special keys belonging to the set is pressed inward, the locking-plate $I^2$ is moved so as to carry its locking projection $J^2$, which stands in the path of the special register corresponding to such key, out of the path thereof and thus permit the register to be pressed inward into engagement with the segments. To this end each locking-plate $I^2$ is provided with three pins $K^2$, Figs. 6, $6^a$, and 7, projecting laterally from it immediately beneath or inside the adjacent guide-plate X', (dotted line, Fig. 9,) each of which pins stands in the path of one of the special keys, whose inner ends are beveled, as shown, so that when either one of the keys is pressed inward its beveled inner end will engage one of the pins $K^2$ and rock the plate $I^2$ rearward against the stress of a spring $L^2$, connected to the plate and yieldingly holding it in normal position. This rearward movement of the plate $I^2$ will carry its locking projections $J^2$ out of the path of the projections $H^2$ of the arms $G^2$ of the special registers, so that the register corresponding to the operated key may be pressed inward in the manner and by the means heretofore explained to engage its pinions with the segments.

With only the mechanism so far described it will be understood that when any one of the special keys was pressed in the corresponding special register would be engaged with the supplemental segments, and at the ensuing operation of the machine the amount indicated by the indicators and added upon the main register of the machine would also be added upon such special register, and this is true in the case of the three special registers in the left-hand set, which registers are appropriated to three clerks "A," "B," and "C" and are employed to separately register the cash-sales made by said clerks, respectively. In the present instance, however, the three special registers in the right-hand set are not employed to register cash-sales, but, on the contrary, to register credit-sales and amounts received on account and amounts paid out. It will therefore be understood that the amounts registered upon the three special registers of this right-hand set must not be added upon the main cash-register of the machine, and I have provided means for maintaining the main register of the machine out of connection with the driving mechanism of the machine whenever any one of the special keys in the right-hand set is pressed in and its corresponding special register engaged with the right-hand set of supplemental segments. It has been heretofore explained that the registering-wheels of the main register are thrown into and out of gear with the main actuating-segments L by means of the idle-pinions Y, which are carried by the arms X, fast upon the rock-shaft W, Fig. 5, which shaft is rocked at the proper times in the operation of the machine by an arm A, which is connected at its forward end with a short arm Z, fast upon said shaft, and fits at its rear end over the shaft F and is provided with a stud D', fitting in a cam-groove in a disk C', fast upon said shaft F. If the front end of the arm A' were simply pivoted to the arm Z of the rock-shaft W, the pinions Y would necessarily be thrown into and out of mesh with their coöperating pinions T U at each operation of the machine to gear the registering-wheels with and ungear them from the driving mechanism, and this was the case in the machine of the prior application referred to. In the present instance, however, the front end of the arm A' is connected to the lower end of the arm Z by a projecting pin or stud $L^2$ upon the arm Z, fitting in a sort of L-shaped slot $M^2$ in the arm A'. In the normal position of the parts the pin upon the arm X fits in the upper end of this L-shaped slot, as seen in Fig. 5, so that any backward and forward movement of the arm A' will rock the shaft W; but it will be understood that if the front end of the arm A' be lifted until the lower horizontal portion of the slot $M^2$ is brought into horizontal line with the pin $L^2$ on the arm Z the arm A' may be moved backward and forward without rocking the shaft W. Now the front end of the arm A' is so connected with the operating devices of the special registers in the right-hand set that whenever any one of such registers is pressed inward and engaged with the supplemental segments the front end of the arm A' is lifted and held in such lifted position during the operation of the machine, so that the shaft W will not be rocked and the pinions Y not engaged with the pinions T U and the registering-wheels of the main register therefore not actuated.

As seen in Fig. 5, the arm A' is provided in rear of the slot $M^2$ with a second slot, in which fits a pin carried by the upper end of a long arm $N^2$, which is fast at its lower end upon a rock-shaft $O^2$, suitably journaled in the framework. At its extreme right-hand end this rock-shaft has fast upon it a depending arm P², Figs. 6 and 6ª, whose lower end stands in the path of rearward movement of the locking-plate I² of the right-hand set of special registers, so that when any one of the special keys in the right-hand set is pressed inward and said locking-plate forced rearward, in the manner heretofore explained, the rock-shaft O² will be turned slightly in the direction of the arrow in Fig. 5 and the upper rear end of the arm N² be thereby thrown slightly upward and the front end of the arm A' lifted into position to permit it to move forward and backward without affecting the rock-shaft W, as before explained. Inasmuch as the locking-plate I² will be held in rearward position by the operated key until such key is released and thrown outward to normal position, and inasmuch as such key is not released until nearly the end of the operation of the machine, it follows that when any special key in the right-hand set is pressed in to engage its corresponding special register with the supplemental segments the connecting devices between the driving mechanism and the main register of the machine will be thrown out of operative position and will be maintained out of operative position during the ensuing operation of the machine, so that the amount indicated at such operation of the machine will be added only upon such special register.

For the purpose of necessitating the operating of some one of the six special keys before the main operating-handle of the machine can be turned there is provided a locking device for the driving mechanism which normally locks it from movement, but unlocks it whenever any one of the special keys is operated. This locking device consists of a rock-shaft Q², extending transversely across the rear side of the machine and suitably journaled in the framework, Fig. 3, and having fast upon it an upwardly-extending arm R², which is provided at its upper end with a hook coöperating with a shoulder formed upon the periphery of the disk C', Fig. 5. So long as the parts are in the position shown in Fig. 5 the arm R² will lock the disk C' and shaft F from turning and consequently prevent any operation of the machine. Near its opposite ends the rock-shaft Q² is provided with two additional upwardly-extending arms S², Figs. 3, 6, and 7, the upper ends of which arms rest against or stand in the path of the rear ends of the arms D², whose forward ends are pivoted to the detent-plate A² and whose rear ends coöperate with the cams F² upon the shaft F in the manner heretofore explained. When any of the special keys in either set is pressed in, the detent-plate A² of such set is forced slightly rearward, which rearward movement is imparted to the arm D², connected to such detent-plate, and the extreme rear end of such arm will engage the upper end of the arm S² of the rock-shaft Q² and force the upper end of such arm slightly rearward, thereby rocking said shaft and throwing the upper end of its locking-arm R² rearward and disengaging it from the shoulder of the disk C², thereby unlocking the driving mechanism.

The transfer devices between the registering-wheels of the special registers are as follows: There is loosely mounted upon the shaft H', midway between the two sets of special registers, a rocking frame A³, Figs. 4, 5, 8, and 9, to whose upper and lower ends are secured two transverse bars B³, whose opposite ends project laterally across the two sets of special registers, as seen in Figs. 1, 2, and 8. Secured to and carried by the opposite ends of these cross-bars B³ are two sets of curved arms or plates C³, there being three of such curved arms in each set. The two cross-bars B³ and the two sets of curved arms C³ are rigidly secured to the frame A³, hung upon the shaft A', and with said frame A³ constitute a rocking frame mounted on said shaft. Pivoted to the upper end of the frame A³ is the forward end of a long curved arm D³, Figs. 4 and 5, whose upper rear end is curved to the right and at its upper extremity is hung upon a stud E³. A short distance below the stud E³ the arm D³ has secured upon its side a plate or block F³, which stands in the path of a cam G³, fast upon the shaft F, heretofore described. At each operation of the machine and revolution of the shaft F the cam G³ will engage the plate F³ and force the arm D³ rearward, thereby rocking the frame A³ and parts carried by it upward and rearward. A coiled spring H³, connected to the arm D³, Fig. 4, resets said arm and the frame A³ as soon as the cam G³ clears the plate F³ on said arm. In this manner and by these means the frame A³ and parts carried by it are rocked upward and rearward and then returned to normal position at each operation of the machine. Now the transfer-pawls I³ are carried by the curved arms C³ of the rocking frame, Figs. 4, 4ª, and 8, being pivoted to the sides of said arms in position to coöperate with the ratchets upon the hubs of the registering-wheels, each of the four right-hand wheels in each train being provided not only with a pinion U', as heretofore described, but also with a ratchet J³ and a disk K³, having upon its periphery a single tooth or projection, Fig. 12, as usual. Each of the transfer-pawls I³ (except the upper ones) is provided at its lower end with two notches which coöperate with a spring-pressed detent L³, confined in a housing secured to the side of the arm C³, and between such end and its pivot the pawl is provided with a notch or cut-away space which forms a shoulder M³. The ratchets of the registering-wheels stand out of the path of travel of the engaging ends of the pawls I³ so long as said pawls remain in the normal position shown upon their respective arms C³, but when the engaging end of any pawl is pressed inward toward the registering-wheels until the inner one of the two notches in its lower end engages the detent $L^3$ such pawl at the next rearward movement of the rocking frame will engage the ratchet of its registering-wheel and advance the latter the space of one tooth to add a unit of value upon such wheel. Mounted in each of the pivoted registering-frames $S'$, between the pivotal support of such frame and the train of wheels carried by it, is a rod $N^3$, Figs. $4^a$, 6, 11, and 12, upon which are mounted a series of spring-pressed holding-pawls $O^3$, engaging the ratchets of the respective wheels to prevent backward movement of the latter.

Mounted upon the rod $N^3$ between the holding-pawls $O^3$ of the first four registering-wheels are a series of sleeves $P^3$, Fig. 10. Each sleeve at its right-hand end is provided with a rearwardly-projecting arm $Q^3$, which stands in the path of travel of the single tooth or projection of the disk $K^3$ upon the adjacent registering-wheel, Fig. 12, while at its left-hand end such sleeve is provided with a projection $R^3$ in line with the transfer-pawl $I^3$ of the next higher registering-wheel in the series, Figs. 10 and 12. Now the projection $R^3$ upon such sleeve normally stands out of the path of travel of said pawl, but when the sleeve is rocked upon the rod $N^3$ the projection $R^3$ will be thrown outward into the path of travel of the pawl, the sleeve being frictionally held in its different positions. As each registering-wheel completes a revolution the tooth or projection of its disk $K^3$ will engage the arm $Q^3$ on the right-hand end of the sleeve $P^3$, interposed between such wheel and the next higher wheel, and as the tooth of the disk $K^3$ rides over and clears the arm $Q^3$ it will rock the sleeve $P^3$ and throw the projection $R^3$ outward into the path of the shoulder $M^3$ of the transfer-pawl, so that at the upward rearward movement of such pawl, as the rocking frame is moved in that direction, the shoulder $M^3$ will contact with the projection $R^3$ and the lower end of the pawl be forced outward and its upper end thrown inward into position to engage the ratchet of its registering-wheel, so that the further rearward movement of the pawl will turn said wheel and effect the transfer. As the pawl approaches the end of its movement the ratchet will have been turned so that the face of the ratchet-tooth which is engaged by the pawl will present an inclined surface to the end of the pawl, and as the latter completes its movement it will ride up over said surface and be thereby rocked upon its pivot back to normal position, its upper rear end being thrown outward and its lower forward end inward, so that the spring-detent $L^3$ reëngages the outer notch in its lower end. As the pawl-carrying frame and pawls move backward (downward and forward) to normal position again the lower end of the pawl will contact with the outwardly-projecting point $R^3$ of the sleeve and rock the latter back to normal position, so that all the parts will be reset at the end of their backward movement.

It will be seen that the transfer-pawls for the upper trains of registering-wheels in each set are placed in reverse position to that of the lower pawls and provided with hooked ends to enable them to properly coöperate with the ratchets. This difference in arrangement is necessitated by the fact that the pivoted frame $S'$, carrying the upper train of wheels in each set, is placed in reverse position to that of the frames carrying the two lower trains of wheels, being pivoted in the fixed frame at its extreme upper rear end, while the frames of the lower trains of wheels are pivoted in the fixed frame at their extreme lower forward ends.

Figure 13:
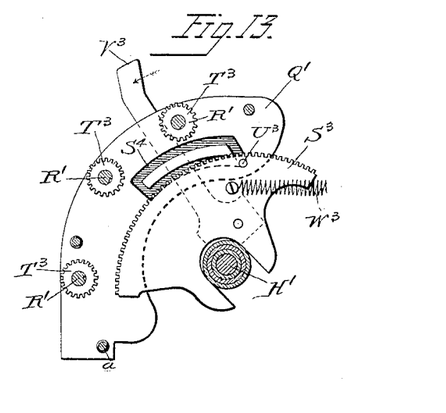
Fig. 13, a vertical section, just inside the left-hand side plate of the frame in Fig. 10, looking toward the left and showing the resetting devices for the registering-wheels.

Interposed between the registering-wheels of each train and the rotary shaft $R'$, upon which the wheels are mounted, are the usual or any suitable devices for causing the rotation of the shafts in one direction to pick up the registering-wheels and return them to initial position, and for the purpose of simultaneously resetting all the wheels in either set the following means are provided, reference being had for convenience to the right-hand set of special registers: Fitting against the inner or right-hand face of the left-hand side plate of the fixed frame $Q'$, in which the special registers are mounted, between such side plate and the adjacent ends of the pivoted frames, in which the special registers are carried, is a curved segment $S^3$, Figs. 11, 12, and 13, provided upon its periphery with gear-teeth adapted to mesh with pinions $T^3$, fast upon the extreme left-hand ends of the shaft $R'$, upon which the wheels are mounted. This segment is mounted to turn upon the shaft $H'$, in the present instance fitting over the sleeves upon said shaft, and is mounted upon said sleeves by an open slot, which permits it to be slid outward and inward toward and from the axis of the shaft $H'$. In its outer position the teeth upon its periphery mesh with the pinions $T^3$, while in its inner position they are disengaged from the pinions. The inner face of the side plate of the frame $Q'$, against which the segment fits, is provided with two curved grooves $S^4$, communicating with each other at their opposite ends, Fig. 13, in which fits a stud or pin $U^3$ upon the side of the segment $S^3$, with the result that when the segment is pulled outward and engaged with the pinions and then moved forward to turn the pinions and shafts and reset the registering-wheels the pin will travel in the upper or outer groove and guide the segment in its movement, and when at the end of its forward movement, after the wheels have been reset, the segment is pressed back inward and moved rearward the pins will travel in the lower or inner groove and guide the segment in its rearward movement. The segment has secured to its left-hand side an operating-handle $V^3$, which fits against the left-hand side of the side plate $Q'$ of the fixed frame, said side plate being embraced between the segment and this handle. In resetting the registers this handle is grasped and the segment drawn outward or radially away from the shaft H' until it is brought into mesh with the pinions T³, and the handle is then pulled forward to its limit of movement, whereupon at the release of the handle a spring W³, connected to the segment, will draw the latter inward toward the shaft A' again and then carry it backward to normal position.

The machine is provided with a printing attachment, Fig. 2, by which the amounts of all transactions are printed upon a paper record-strip and also upon checks or tickets issued by the machine. This printing attachment forms no part of my present invention and has been fully illustrated and described in various prior patents, and therefore need not be further referred to here.

Having thus fully described my invention, I claim—

1. The combination, with the main segments and means for actuating them, of a series of supplemental segments respectively connected with the several main segments so as to move with them, a series of special registers, and means for throwing either register at will into gear with the supplemental segments, substantially as described.

2. The combination, with the main segments and means for actuating them, and the main register actuated by said segments, of a series of supplemental segments connected respectively to the several main segments so as to move with them, and a series of special registers and means for throwing either register at will into gear with the supplemental segments, substantially as described.

3. The combination, with the main segments and means for actuating them, and the main register actuated by said segments, of a series of supplemental segments connected respectively to the several main segments so as to move with them, a series of special registers for registering transactions which are not to be registered upon the main register, and means for throwing either special register at will into gear with the supplemental segments and preventing the operation of the main register by the main segments, substantially as described.

4. The combination, with the main segments and means for actuating them, and the main register actuated by said segments, of the two series of supplemental segments, the segments in each series being respectively connected with the several main segments so as to move with them, two series of special registers, one series for registering upon different registers transactions registered upon the main register, and the other for registering transactions not registered upon the main register, means for throwing either special register at will into gear with the corresponding series of supplemental segments, and means for preventing operation of the main register by the main segments when either one of the special registers for registering transactions not to be registered upon the main register is thrown into gear with the corresponding series of supplemental segments, substantially as described.

5. In a cash-register, the combination, with a driving mechanism and a main register actuated thereby, of a series of special registers and means for connecting either special register at will with the driving mechanism, and preventing operation of the main register by said mechanism, substantially as described.

6. In a cash-register, the combination, with a driving mechanism, a main register and means for connecting such register with the driving mechanism, of a series of special registers and means for connecting either of them at will with the driving mechanism and maintaining the connecting means between the main register and driving mechanism in inoperative position, substantially as described.

7. In a cash-register, the combination, with the driving mechanism, the main segments, the main register, the gearing between such segments and the wheels of the main register, including the idle-pinions for connecting and disconnecting the segments and registering-wheels, and a cam for operating said idle-pinions, of the series of supplemental segments connected to the main segments, the series of special registers, and means for throwing either of such registers at will into gear with the supplemental segments and maintaining the idle-pinions out of operative connection with their actuating-cam, substantially as described.

8. The combination, with the rock-shaft of the driving mechanism, the series of main segments loosely mounted thereon, means for connecting the segments with and disconnecting them from the rock-shaft and for determining the degrees of movement imparted to them by said shaft, of the series of supplemental segments respectively connected with the several main segments, and the series of special registers and means for throwing either of them at will into gear with the supplemental segments, substantially as described.

9. The combination, with the rock-shaft of the driving mechanism, the series of main segments loosely mounted thereon, means for connecting the segments with and disconnecting them from the rock-shaft and for determining the degrees of movement imparted to them by said shaft, and the main register actuated by said segments, of the series of supplemental segments respectively connected to the main segments, and the series of special registers and means for throwing either of them at will into gear with the supplemental segments and preventing operation of the main register by the main segments, substantially as described.

10. The combination, with the rock-shaft of the driving mechanism, the series of main segments loosely mounted thereon, means for connecting the segments with and disconnecting them from the rock-shaft and for determining the degrees of movement imparted to them by said shaft, and the main register actuated by said segments, of the two series of supplemental segments, the segments in each series being respectively connected to the several main segments, the two series of special registers, one series coöperating with each series of supplemental segments, means for connecting either register in either series with the corresponding supplemental segments, and means for preventing operation of the main register by the main segments when either special register in one of the series of special registers is thrown into gear with the corresponding supplemental segments, substantially as described.

11. In a cash-register, the combination of a series of reciprocating segments, a series of special registers, a series of special keys coöperating with the several registers to engage them at will with the segments, and locking means for said registers controlled by said keys for preventing engagement of either register with the segments without operating one of said keys, substantially as described.

12. In a cash-register, the combination of a series of reciprocating segments, a series of registers adapted to be independently connected with and actuated by the segments, a series of special keys coöperating with the several registers to engage them with the segments, and means actuated by the driving mechanism for moving the respective keys and causing them to engage the registers with the segments, substantially as described.

13. In a cash-register, the combination of a series of reciprocating segments, a series of registers adapted to be independently connected with and actuated by the segments, a series of special keys coöperating with the several registers to engage them with the segments, and the detent-plate actuated by the driving mechanism and provided with cams coöperating with the keys to move the latter to carry the registers into engagement with the segments, substantially as described.

14. In a cash-register, the combination of a series of reciprocating segments, a series of registers adapted to be independently connected with and actuated by the segments, a series of special keys coöperating with the several registers to engage them with the segments, and the detent-plate $A^2$ actuated by the driving mechanism and provided with the shoulders $b$ and cams $c$ coöperating with projections upon the several keys in the manner and for the purpose described.

15. In a cash-register, the combination, with a series of reciprocating segments, of a fixed frame, a series of registering-frames $S'$ pivoted in said fixed frame and each carrying a train of registering-wheels, a series of keys coöperating with the frames $S'$ to move the latter into position for the registering-wheels to gear with the segments, the detent-plate $A^2$ having the shoulders $b$ and cams $c$ coöperating with projections on the keys, and means for actuating the plate $A^2$, substantially as described.

16. In a cash-register, the combination, with the reciprocating segments, of a fixed frame, a series of registering-frames $S'$ pivoted in the fixed frame and each carrying a train of registering-wheels, a locking-plate normally operating to prevent movement of the registering-frames $S'$, a series of keys corresponding to the several registering-frames and coöperating with the same and the locking-plate to release the frames and swing them into position for their registering-wheels to gear with the segments, a detent-plate provided with shoulders and cams coöperating with projections upon the keys, and means for actuating said plate, substantially as described.

17. In a cash-register, the combination, with a series of reciprocating segments, of the curved frames $Q'$ secured in fixed position over the segments, the frames $S'$ pivoted in the frame $Q'$ and each provided with an arm $G^2$ having a projection $H^2$, a series of special keys, one for each register and adapted to engage the projection $H^2$ of the arm of its frame, the detent-plate $A^2$ having the shoulders $b$ and cams $c$ coöperating with projections on the keys, and means for actuating said plate, substantially as described.

18. In a cash-register, the combination, with the main segments, the main register, the idle-pinions mounted in a swinging frame, the cams and connections for rocking said frame and engaging the pinions with and disengaging them from the gearing between the segments and registering-wheels, of the series of supplemental segments, the series of special registers, the series of special keys coöperating therewith to engage the special registers with the supplemental segments, a movable plate coöperating with said special keys and moved by the operation of any one of them, and means intermediate said plate and the actuating devices for the frame carrying the idle-pinions by which the operation of any one of said keys and consequent movement of said plate will render such actuating device inoperative and prevent the main register being connected with the main segments, substantially as described.

19. In a cash-register, the combination, with the main segments, the main register, the idle-pinions Y mounted in a rocking frame X provided with the arm Z, the rotary cam $C'$, and the arm $A'$ interposed between said cam and the arm Z and connected with the latter by the slot and pin, of the series of supplemental segments respectively connected to the several main segments, the series of special registers, the series of special keys coöperating with said registers to engage them with the segments, the locking-plate $I^2$ coöperating with the special registers and keys, the rock-shaft $O^2$ having the arm $P^2$ standing in the path of movement of the plate $I^2$, and the arm $N^2$ fast at one end upon the rock-shaft $O^2$ and coöperating at its other end with the arm $A'$ which connects the reciprocating cam with the rocking frame carrying the idle-pinions, substantially as and for the purpose described.

20. The combination of the special keys provided with the projections $C^2$, the detent-plate $A^2$ provided with the shoulders $b$ and cams $c$ coöperating with said projections, the rotary cam $F^2$, and means actuated by said cam and connected to the detent-plate for moving the latter, substantially as described.

21. The combination, with the series of supplemental segments, the series of special registers mounted in movable frames over said segments, the series of special keys coöperating with said frames to move the several registers into gear with the segments, the detent-plate $A^2$ provided with the shoulders $b$ and cams $c$ coöperating with projections upon the keys, the rotary cam $F^2$ and means actuated by said cam and connected to the detent-plate for moving the latter, substantially as described.

22. The combination, with the series of special registers, of the reciprocating frame composed of the members $A^3 B^3 C^3$, and the transfer-pawls $I^3$ carried by the members $C^3$ and coöperating with the ratchets and pawl-setting devices of the registers in the manner described.

23. The combination of two registering-wheels, the higher provided with a ratchet and the lower provided with a projection $K^3$, a rocking sleeve or member $P^3$ interposed between the two wheels and provided at one end with a projection $R^3$ adjacent the higher wheel and its opposite end with an arm or projection in the path of the projection $K^3$ of the lower wheel, and a transfer-pawl $I^3$ carried by a reciprocating member $C^3$ and coöperating with the projection $R^3$ and with the ratchet of the higher registering-wheel in the manner and for the purpose described.

24. The combination of two registering-wheels, the higher provided with a ratchet and the lower provided with a projection $K^3$, a rocking sleeve or member $P^3$ interposed between the two wheels and provided at one end with a projection $R^3$ adjacent the higher wheel and at its opposite end with an arm or projection in the path of the projection $K^3$ of the lower wheel, a reciprocating pawl-carrier $C^3$, a transfer-pawl $I^3$ pivoted upon said carrier and provided with a shoulder $M^3$ to coöperate with the projection $R^3$ on the sleeve $P^3$, and with an engaging end to coöperate with the ratchet of the higher registering-wheel, and the spring-pressed detent $L^3$ coöperating with the pawl, substantially as described.

25. The combination of a series of trains of registering-wheels mounted upon resetting-shafts $R'$ provided with pinions $T^3$, a segment $S^3$ adapted to be moved into engagement with the pinions of all the shafts and turned to reset the registering-wheels to zero, and a plate or frame $Q'$ provided with grooves $S^4$ coöperating with a pin $U^3$ upon the segment $S^3$ to guide the latter in its movements, substantially as described.

26. The combination, with the shafts $R'$ of the series of registers, provided with the pinions $T^3$, of the segment $S^3$ provided with the handle $V^3$ and adapted to be engaged with all the pinions $T^3$ at once and turned to rotate said pinions and the shafts $R'$ to reset the registering-wheels, substantially as described.

27. The combination, with the shafts $R'$ of the several registers, provided with the pinions $T^3$, of the shaft $H'$, the segment $S^3$ provided with a slot by which it is mounted upon the shaft $H'$ so as to turn thereon and slide radially thereto, a handle $V^3$ for moving the segment radially away from the shaft and engaging it with the pinions $T^3$ of all the shafts $R'$ and turning it upon the shaft $H'$ to reset the registering-wheels, a plate or frame $Q'$ having a groove $S^4$ coöperating with a pin $U^3$ on the segment $S^3$, and a spring $W^3$ for resetting the segment, substantially as described.

JOSEPH P. CLEAL.

Witnesses:
PEARL N. SIGLER,
ALVAN MACAULEY.